United States Patent
Sakai

[11] Patent Number: 5,999,367
[45] Date of Patent: Dec. 7, 1999

[54] CRAMP MECHANISM OF A MAGNETIC DISK DEVICE

[75] Inventor: Yoshihiro Sakai, Ibaraki, Japan

[73] Assignee: NEC Corporation, Tokyo, Japan

[21] Appl. No.: 09/079,145

[22] Filed: May 15, 1998

[30] Foreign Application Priority Data

May 15, 1997 [JP] Japan ................................ 9-125583

[51] Int. Cl.$^6$ ................................................ G11B 17/08
[52] U.S. Cl. ........................................ 360/99.12; 360/98.08
[58] Field of Search ............................ 360/98.08, 99.12; 369/270

[56] References Cited

U.S. PATENT DOCUMENTS

| 5,497,281 | 3/1996 | Jewell et al. | 360/98.08 |
| 5,517,376 | 5/1996 | Green | 360/98.08 |
| 5,636,083 | 6/1997 | Sanada | 360/98.08 |
| 5,801,901 | 9/1998 | Bryan et al. | 360/98.08 |

*Primary Examiner*—William J. Klimowicz
*Attorney, Agent, or Firm*—Foley & Lardner

[57] ABSTRACT

To provide cramp mechanism for cramping a disk medium (3) with an even cramp load without needing special process such as heating shrinkage fit, the cramp mechanism comprises a disk cramper (4) having an inside opening and a cramping part (A) for cramping the disk medium (3), a cylindrical wall provided on a spindle hub (2) having the same center axis with a spindle motor (7), and a cramp nut (5). The outside surface of the cylindrical wall is configured to make a clearance fit at a fitting part (B) with the inside opening of the disk cramper (4), and the inside surface of the cylindrical wall is made tapered and provided with screw threads. On condition that the disk cramper (4) is added with a pre-load for cramping the magnetic disk medium (3), the cramp nut (5) is screwed onto the spindle hub (2) engaging with the screw threads with a tightening force (C) so as to deform the fitting part (B) to make a close fit with the disk cramper (4).

3 Claims, 3 Drawing Sheets

1: BASE PLATE
7: SPINDLE MOTOR

2: SPINDLE HUB
5: CRAMP NUT
6: SCREW THREAD
4: DISK CRAMPER
3: DISK MEDIUM

A: SWELLING PART
B: FITTING PART
C: TIGHTENING FORCE

CRAMP MECHANISM OF A MAGNETIC DISK DEVICE

BACKGROUND OF THE INVENTION

The present invention relates to a magnetic disk device, and particularly to a cramp mechanism for fixing a magnetic disk medium to a spindle hub of the magnetic disk device.

FIG. 2A is a front view illustrating an example of cramp mechanism of a conventional magnetic disk device, whereof a sectional view is illustrated in FIG. 2B.

Referring to FIG. 2B, a magnetic disk medium (hereafter simply called the disk medium) 13, consisting of one or more piled disks, is set on a spindle hub 12, in the example. A disk cramper 14 is fastened to the spindle hub 12 over the disk medium 13 with a plurality (six in the example) of cramp screws 15 ranged in a circle at even intervals around the hub center, which fixes the disk medium 13 by pressing the disk medium 13 with a cramp load through a cramping part D provided at a circular edge of the disk cramper 14.

However, there is a problem, in this type of cramp mechanism, that the cramp load pressing the disk medium 13 varies cyclically in circumferential direction, as illustrated in FIG. 5.

FIG. 5 is a graphic chart illustrating the cramp load pressing the disk medium 13 along the cramping part D, which is represented by a dashed line of FIG. 2A, of the disk cramper 14, wherein six peaks of the cramp load are found at points D1, D2, . . . , each representing a nearest point of the cramping part D from each of the plurality of cramp screws 15.

This variation of the cramp load causes warping or waving of the disk medium 13.

For resolving this problem, in some conventional magnetic disk device, cramp mechanism making use of heating shrinkage fit is applied. FIG. 3 is a sectional view illustrating an example of the cramp mechanism making use of the heating shrinkage fit.

Referring to FIG. 3, a disk cramper 24 is fastened to a spindle hub 22 by way of heating shrinkage fit at a fitting part E. The external diameter of the spindle hub 22 and the internal diameter of the disk cramper 24 are fabricated so as to make a close fit of the fitting part E. When they are assembled, the fitting part E of the disk cramper 24 is heated so as to make a clearance fit of the fitting part E.

The heated disk cramper 24 is inserted into and maintained on the spindle hub 22 with a pre-load added from outside evenly in circumferential direction at a cramping part F provided at a circular edge of the disk cramper 24. The pre-load is retained until the disk cramper 24 is made cool. Therefore, the disk cramper 24 is fastened to the spindle hub 22 at the fitting part E retaining the even pre-load, which works as an even cramp load for cramping the disk medium 23 with little warping or waving.

In the magnetic disk devices such as above described, the piled disk medium should be cramped by the cramp mechanism with a cramp load giving more than a certain pressure not to be shifted by an unexpected shock, and, at the same time, the disk medium should be cramped with minimum warping or waving for ensuring a stable posture of a magnetic head flying on the surface of the disk medium.

When there is warping or waving of the disk medium caused by uneven cramp load such as described in connection with the cramp mechanism of FIGS. 2A and 2B, the flying posture of the magnetic head becomes unstable, which degrades magnetoelectric performance of the magnetic head or may result even in a head crash. When tightening force of the cramp screws 15 is lightened for reducing variation of the cramping load, the disk medium 13 may be shifted with an unexpected shock, even if the problem of warping or waving is improved. Therefore, with the cramp mechanism of the first example of FIGS. 2A and 2B wherein the disk cramper 14 is fastened by the cramp screws 15, there is a limit in reduction of the flying clearance between the magnetic head and the disk medium, and consequently there is a limit in improvement of performance and reliability of the magnetic disk device.

As to the cramp mechanism making use of the heating shrinkage fit such as described in connection with FIG. 3, the disk cramper 24 is inserted to the spindle hub 22 being given with an even pre-load for cramping the disk medium 23 making use of size difference between the members made by thermal expansion, and tightened in the radial direction to the spindle hub after the disk cramper 24 is cooled. Therefore, an even cramp load is obtained and the problem of warping or waving because of the uneven cramp load made by cramp screws 15 of FIGS. 2A and 2B can be eliminated in the disk medium 23 of FIG. 3. However, there is a fear of bad influences remaining in the peripheral members caused by the heat treatment, on the other hand.

Furthermore, there is another problem that special equipment including a jug is needed exclusively for the heating shrinkage fit, which interferes the productivity in mass production of the magnetic disk device.

SUMMARY OF THE INVENTION

Therefore, a primary object of the present invention is to provide a magnetic disk device having cramp mechanism of high productivity which does not need any troublesome process such as the heating shrinkage fit, and at the same time, enables to realize uniformity of the cramp load, in order to improve performance, reliability, durability and productivity as well of the magnetic device by reducing warping and waving of the disk medium for ensuring a stable flying posture of the magnetic head.

In order to achieve the object, the cramp mechanism of the invention, for cramping a magnetic disk medium on a spindle hub of the magnetic disk device, comprises:

a disk cramper having an inside opening at a center part thereof and a cramping part at a circular edge thereof for cramping the magnetic disk medium;

a cylindrical wall provided on the spindle hub, said cylindrical wall having the same center axis with a spindle motor for driving the spindle hub, an outside surface of the cylindrical wall being configured parallel to the center axis and having a fitting part for fitting to the inside opening of the disk cramper, and an inside surface of the cylindrical wall being made tapered so as to form an inverse conical pit inside the cylindrical wall and provided with screw threads; and a cramp nut having a side surface tapered and provided with screw threads for engaging with the screw threads of the inside surface of the cylindrical wall when the cramp nut is screwed into the inverse conical pit.

An external diameter of the outside surface of the cylindrical wall and an internal diameter of the inside opening of the disk cramper are fabricated for fitting to each other with a clearance fit at the fitting part when the cramp nut is not screwed into the inverse conical pit, and for fitting to each other with a close fit when the cramp nut is screwed into the inverse conical pit with a certain force.

The cramp nut is screwed into the inverse conical pit with the certain force for assembling the cramp mechanism when the disk cramper is set to the spindle hub added with a pre-load for cramping the magnetic disk medium between the cramping part thereof and the spindle hub.

Therefore, the uniformity of the cramp load can be easily realized by screwing the cramp nut, according to the cramp mechanism of the invention, without any special process such as the heating shrinkage fit, and warping or waving of the magnetic medium can be reduced without fear of bad influences of the heat treatment, ensuring a stable flying posture of the magnetic head.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings.

DETAILED DESCRIPTION OF THE PREFERRED EMBODIMENTS

Now, embodiments of the present invention will be described in connection with the drawings.

Figure 1A:
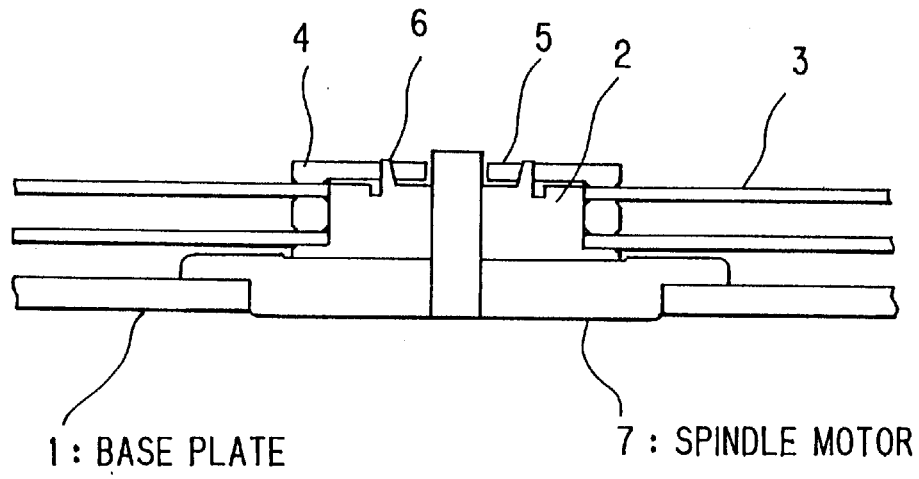
FIG. 1A is a sectional view illustrating a magnetic disk device provided with cramping mechanism according to an embodiment of the invention.
Figure 1B:
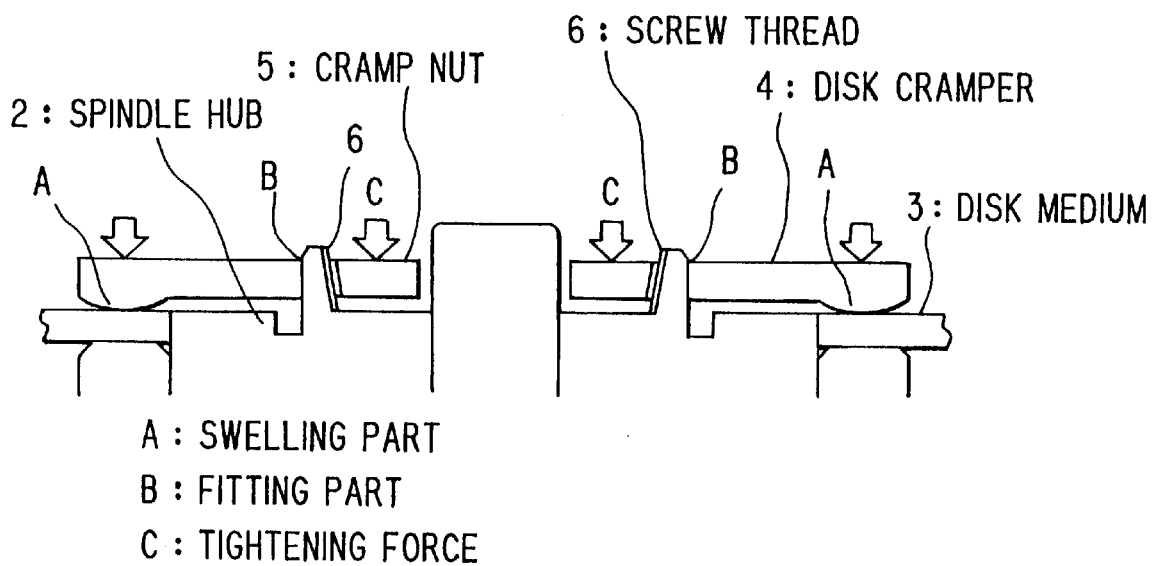
FIG. 1B is a partial magnification illustrating cramp mechanism of the magnetic disk device of FIG. 1A.
Figure 2A:
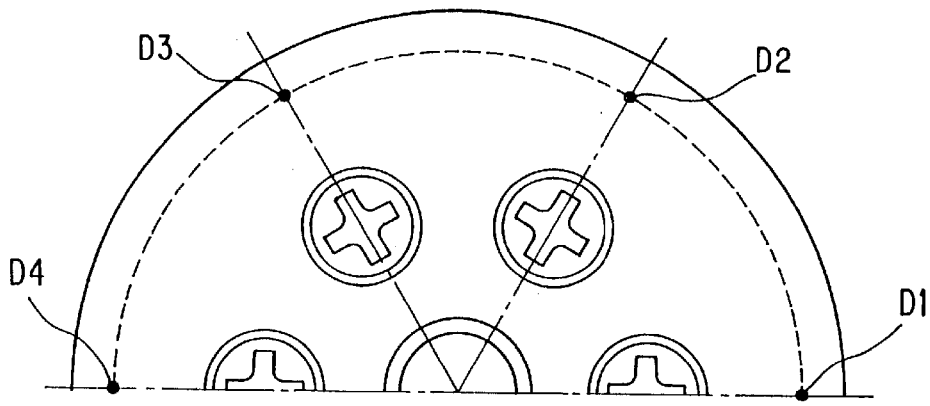
FIG. 2A is a front view illustrating an example of cramp mechanism of a conventional magnetic disk device.
Figure 2B:
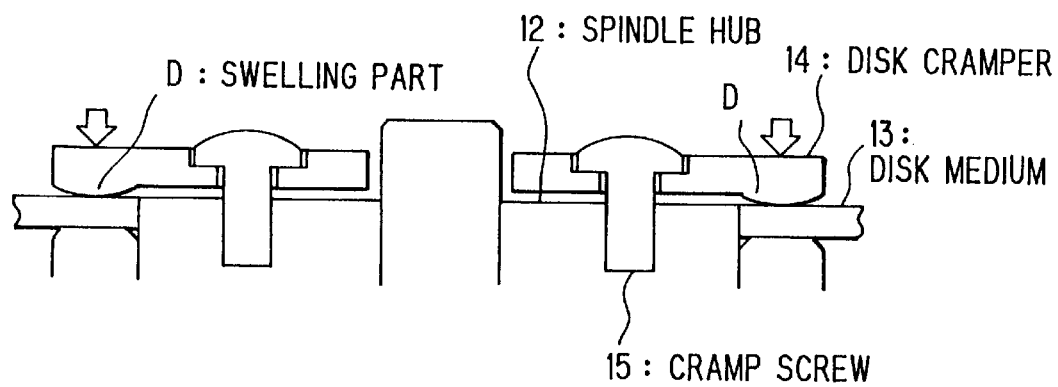
FIG. 2B is a sectional view of the cramp mechanism of FIG. 2A.

FIG. 1A is a sectional view illustrating a magnetic disk device provided with cramping mechanism according to an embodiment of the invention, and FIG. 1B is a partial magnification illustrating cramp mechanism of the magnetic disk device of FIG. 1A.

Figure 3:
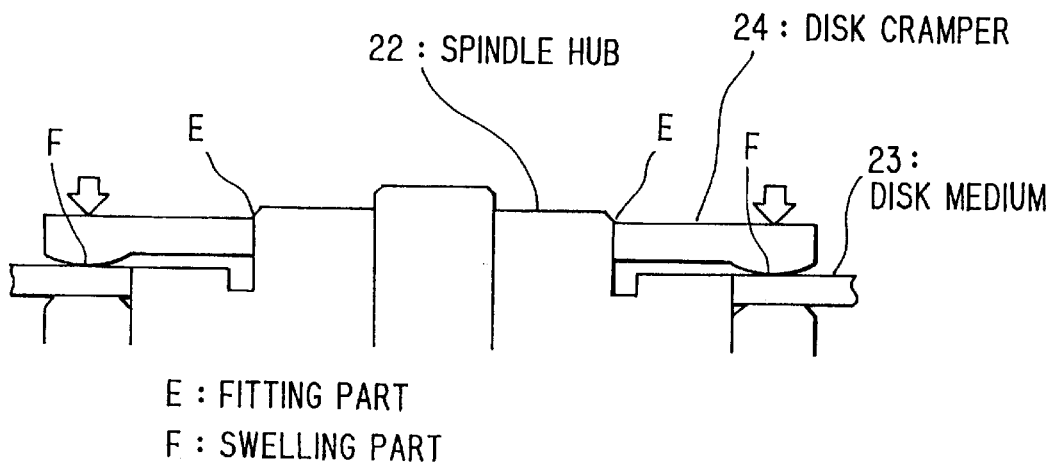
FIG. 3 is a sectional view illustrating another conventional example of the cramp mechanism making use of heating shrinkage fit.

Referring to FIGS. 1A and 1B, the cramp mechanism of the embodiment comprises;

a disk cramper 4 having an inside opening and a cramping part A at a circular edge thereof for cramping a disk medium 3, being configured similarly to the disk cramper 24 of FIG. 3 wherein the heating shrinkage fit is applied, a spindle hub 2 having a cylindrical wall, an outside surface of the cylindrical wall, which is configured parallel to a center axis of a spindle motor 7 fixed on a base plate 1 for driving the spindle hub 2, having a fitting part B for fitting to the inside opening of the disk cramper 4, and an inside surface of the cylindrical wall, which is made tapered so as to form an inverse conical pit inside the cylindrical wall, being provided with screw threads 6, and a cramp nut 5 having a side surface tapered and provided with screw threads for engaging with the screw threads 6 when the cramp nut 5 is screwed into the inverse conical pit formed inside of the cylindrical wall of the spindle hub 2.

At the fitting part B, the external diameter of the cylindrical wall of the spindle hub 2 and the internal diameter of the inside opening of the disk cramper 4 are fabricated so as to leave a narrow slit, several μm, for example, between the spindle hub 2 and the disk cramper 4.

For assembling the cramp mechanism, the disk cramper 4 is first set to fit to the spindle hub 2 at the fitting part B. Since the external diameter of the spindle hub 2 and the internal diameter of the disk cramper 4 are prepared to make the clearance fit, a narrow slit is left between them.

Then, the disk cramper 4 is pressed downwards (of FIG. 1B) with an even pre-load so that the circular cramping part A cramps the disk medium 3, and the cramp nut 5 is screwed into the inverse conical pit of the spindle hub 2 retaining the pre-load.

By screwing the cramp nut 5 into the inverse conical pit, a tightening force C for pressing the cramp nut 5 downwards (of FIG. 1B) is generated according to the screwing force of the cramp nut 5, as depicted in FIG. 1A. Therefore, the inside surface of the cylindrical wall having the screw threads 6, which is tapered, is pressed outwards by the horizontal component of the tightening force C.

Thus, the disk cramper 4 of the embodiment can be tightened to the spindle hub 2 at the fitting part B with a sufficient close fit without any heat treatment, and, after a pre-load is removed, a sufficient and even cramp load is retained at the cramping part A for cramping the disk medium 3.

Figure 4:
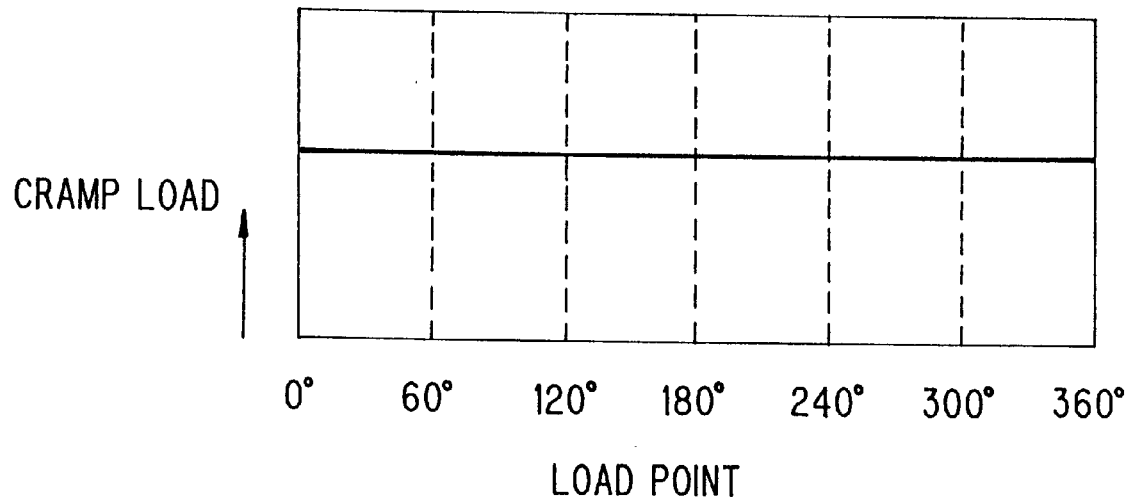
FIG. 4 is a graphic chart illustrating the cramp load working at the cramping part A of the disk cramper 4 of FIG. 1B.
Figure 5:
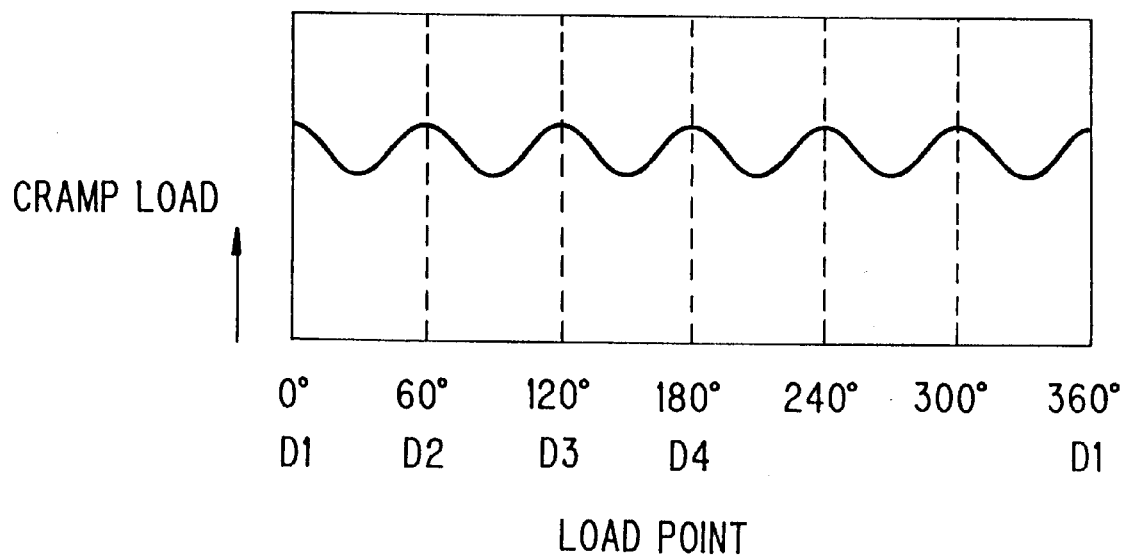
FIG. 5 is a graphic chart illustrating the cramp load pressing the disk medium 13 of FIG. 2B along the cramping part D.

FIG. 4 is a graphic chart illustrating the cramp load working at the cramping part A of the disk cramper 4 of the embodiment. As shown in FIG. 4, an even value of the cramp load is obtained everywhere on the circular cramping part A, realizing little warping or waving of the disk medium 3 of the embodiment, since there is no discrete factor such as the cramp screws 15 of FIGS. 1A and 1B affecting the cramp load.

Furthermore, the cramp mechanism according to the embodiment can be easily assembled or disassembled only by screwing or removing the cramp nut 5 into/from the inverse conical pit of the spindle hub 2. Therefore, it is not necessary to prepare any special equipment for assembling or disassembling the magnetic disk device, or to perform any heat treatment which may cause bad influences.

As heretofore described, an even cramp load for cramping the disk medium can be realized with the cramp mechanism of the invention, which reduces warping or waving of the disk medium. Therefore, a more stable flying posture of the magnetic head is ensured in the magnetic disk device, which enables higher recording density and higher performance of the magnetic disc device.

Further, the productivity of the magnetic disk device can be also improved with easiness of assembling and disassembling of the cramp mechanism whereof members can be tightened by screwing.

What is claimed is:

1. A cramp mechanism of a magnetic disk device for cramping a magnetic disk medium on a spindle hub of the magnetic disk device; said cramping mechanism comprising:

a disk cramper having an inside opening at a center part thereof and a cramping part near a circular edge thereof for cramping the magnetic disk medium;

a cylindrical wall provided on the spindle hub, said cylindrical wall having the same center axis with a spindle motor for driving the spindle hub and an inside surface of the cylindrical wall being made tapered so as to form an inverse conical pit inside the cylindrical wall and provided with screw threads; and a cramp nut having a side surface tapered and provided with screw threads for engaging with the screw threads of the inside surface of the cylindrical wall when the cramp nut is screwed into the inverse conical pit to provide an outward force of the cylindrical wall against the inside opening of the disk cramper.

2. The cramp mechanism recited in claim 1, wherein an external diameter of the outside surface of the cylindrical wall and an internal diameter of the inside opening of the disk cramper are fabricated for fitting to each other with a clearance fit at a fitting part when the cramp nut is not screwed into the inverse conical pit, and for fitting to each other with a close fit at the fitting part when the cramp nut is screwed into the inverse conical pit with a certain force.

3. The cramp mechanism recited in claim 2, wherein the cramp nut is screwed into the inverse conical pit with the certain force for assembling the cramp mechanism when the disk cramper is set to the spindle hub added with a pre-load for cramping the magnetic disk medium between the cramping part thereof and the spindle hub.

* * * * *